United States Patent
An

(10) Patent No.: US 9,153,870 B2
(45) Date of Patent: Oct. 6, 2015

(54) BROADBAND MOBILE PHONE ANTENNA WITH PARASITIC ANTENNA AND MOBILE PHONE

(71) Applicant: Huizhou TCL Mobile Communication CO., LTD., Hui Zhou (CN)

(72) Inventor: Xinrong An, Ningbo (CN)

(73) Assignee: HUIZHOU TCL MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 14/401,507

(22) PCT Filed: Aug. 1, 2013

(86) PCT No.: PCT/CN2013/080604
§ 371 (c)(1),
(2) Date: Nov. 14, 2014

(87) PCT Pub. No.: WO2014/086163
PCT Pub. Date: Jun. 12, 2014

(65) Prior Publication Data
US 2015/0148110 A1 May 28, 2015

(30) Foreign Application Priority Data
Dec. 7, 2012 (CN) .......................... 2012 1 0522150

(51) Int. Cl.
*H01Q 9/04* (2006.01)
*H01Q 1/24* (2006.01)
*H01Q 9/14* (2006.01)
*H01Q 5/378* (2015.01)
*H01Q 5/392* (2015.01)
*H01Q 19/00* (2006.01)
*H04B 1/40* (2015.01)
*H04M 1/02* (2006.01)

(52) U.S. Cl.
CPC ............. *H01Q 9/0442* (2013.01); *H01Q 1/243* (2013.01); *H01Q 5/378* (2015.01); *H01Q 5/392* (2015.01); *H01Q 9/14* (2013.01); *H01Q 19/005* (2013.01); *H04B 1/40* (2013.01); *H04M 1/026* (2013.01)

(58) Field of Classification Search
CPC ... H01Q 9/0442; H01Q 19/005; H01Q 5/378; H01Q 5/392; H01Q 9/14; H01Q 1/243; H04B 1/40; H04M 1/026
See application file for complete search history.

(56) References Cited

U.S. PATENT DOCUMENTS

| | | | |
|---|---|---|---|
| 2007/0052599 A1* | 3/2007 | Shimizu et al. | 343/702 |
| 2007/0182638 A1* | 8/2007 | Rowell | 343/700 S |
| 2013/0307753 A1* | 11/2013 | Andrenko | 343/904 |

FOREIGN PATENT DOCUMENTS

| | | |
|---|---|---|
| CN | 101095262 A | 12/2007 |
| CN | 101714689 | 5/2010 |
| CN | 101911387 A | 12/2010 |
| CN | 103001006 A | 3/2013 |

* cited by examiner

*Primary Examiner* — Dinh P Nguyen
(74) *Attorney, Agent, or Firm* — Shimokaji IP

(57) ABSTRACT

A broadband mobile phone antenna with a parasitic antenna and a mobile phone thereof are disclosed. The mobile phone antenna includes a main antenna and a matching circuit thereof, a first antenna switch connected with the main antenna and the matching circuit thereof. The first antenna switch is used to perform frequency band switching of the main antenna. The mobile phone antenna also includes a parasitic antenna, at least two second matching circuits, and a second antenna switch connected with the parasitic antenna and the second matching circuits. The parasitic antenna is set on one side of the main antenna. The second antenna switch is controlled by a mobile phone base band chip and is used to make the parasitic antenna switch between the second matching circuits.

20 Claims, 2 Drawing Sheets

BROADBAND MOBILE PHONE ANTENNA WITH PARASITIC ANTENNA AND MOBILE PHONE

TECHNICAL FIELD

The present disclosure relates to the field of mobile terminals, and in particular to, a broadband mobile phone antenna with a parasitic antenna and a mobile phone.

BACKGROUND

Mobile networks have recently developed from 3G to LTE (Long Term Evolution). Meanwhile, traditional 2G and 3G mobile networks are still in use. Therefore, LTE mobile phones are required to be capable of covering multiple frequency bands including 2G/3G/4G. Accordingly, a very wide mobile phone antenna band width is required. However, size of mobile phone motherboards are limited. Therefore, available space for a mobile phone antenna is also limited. Furthermore, a traditional mobile phone antenna cannot be used satisfactorily to cover different frequency bands as required, and, particularly, cannot realize low frequency bandwidth-intensive coverage.

As shown in FIG. 1, an antenna part of a traditional mobile phone radio frequency front end includes a main antenna and a matching circuit thereof, wherein the main antenna is controlled by a main antenna switch to switch between different frequency bands. Logic of the main antenna switch is generally set by a radio frequency hardware engineer together with a radio frequency software engineer.

In order to enable a mobile phone antenna to cover a wider frequency range, researchers have proposed adding a parasitic antenna on a traditional mobile phone antenna. However, it has been found in tests that, even if a frequency band coverage requirement is fulfilled, antenna performance requirement is very difficult to satisfy. Particularly, when covering a low frequency bandwidth-intensive of 700 M (LTE Band12, B17 and the like)—960 MHz (GSM900, WCDMA Band8), antenna performance requirements are difficult to satisfy.

Therefore, the prior art still needs to be improved and developed.

SUMMARY

A broadband mobile phone antenna, with a variable parasitic antenna, and a mobile phone are provided to satisfy low frequency bandwidth-intensive coverage.

A broadband mobile phone antenna with a parasitic antenna includes a main antenna and a matching circuit thereof, and a first antenna switch connected with said main antenna and the matching circuit thereof, wherein said first antenna switch is also connected with a mobile phone base band chip and a mobile phone motherboard, that are used to perform frequency band switching of said main antenna; a second antenna switch connected to the parasitic antenna and at least two second matching circuits, and connected with said mobile phone base band chip, wherein said parasitic antenna is used to change a resonance frequency of the main antenna by coupling with said main antenna; said second antenna switch is controlled by the mobile phone base band chip, working on a same frequency band as that of said first antenna switch, and is used to make said parasitic antenna switch between said at least two second matching circuits; and the first antenna switch is a main antenna switch, and the at least two second antenna switches are parasitic antenna switches.

In another broadband mobile phone antenna with a parasitic antenna embodiment, one end of at least one of at least two second matching circuits is grounded.

In a further broadband mobile phone antenna with a parasitic antenna embodiment, a throw number of a second antenna switch is greater than or equal to a number of at least two second matching circuits.

In yet a further broadband mobile phone antenna with a parasitic antenna embodiment, said parasitic antenna is arranged on a main antenna support, and shares the support with the main antenna.

In another broadband mobile phone antenna with a parasitic antenna embodiment, a parasitic antenna is arranged on a main PCB of the mobile phone in a printed manner.

In a further broadband mobile phone antenna with a parasitic antenna embodiment, a parasitic antenna may be an FPC antenna, a metal stamping antenna or a laser direct structuring antenna.

In yet a further broadband mobile phone antenna with a parasitic antenna embodiment, a second antenna switch is arranged on a radio frequency circuit of a mobile phone motherboard.

In another embodiment, a broadband mobile phone antenna with a parasitic antenna includes two second matching circuits.

In a further embodiment, a broadband mobile phone includes a broadband mobile phone antenna with a parasitic antenna.

In yet another embodiment, a broadband mobile phone antenna with a parasitic antenna and the mobile phone provided by the present invention includes, a parasitic antenna arranged on the basis of not changing an original main antenna of the mobile phone, and said parasitic antenna is connected with different matching circuits through a parasitic antenna switch so as to have different load characters. In a further embodiment, a main antenna is enabled to work at different working states by coupling a parasitic antenna and the main antenna to influence a resonance frequency of said main antenna.

In at least one embodiment, the present invention enables a mobile phone antenna to cover different working frequency bands, thus expanding a working band of the mobile phone antenna, and simultaneously performance of the mobile phone antenna is significantly improved. Moreover, in at least one embodiment, the present invention is simple to design, has very low implementation cost, and is very suitable to be popularized and used in a broadband mobile phone integrating LTE, 3G and 2G.

DETAILED DESCRIPTION

The present invention is further described in detail with reference to the drawings herein. It should be understood that specific embodiments described herein are included for illustrative purposes only and are not intended to limit the scope of the present invention as defined by the appending claims.

Figure 1:
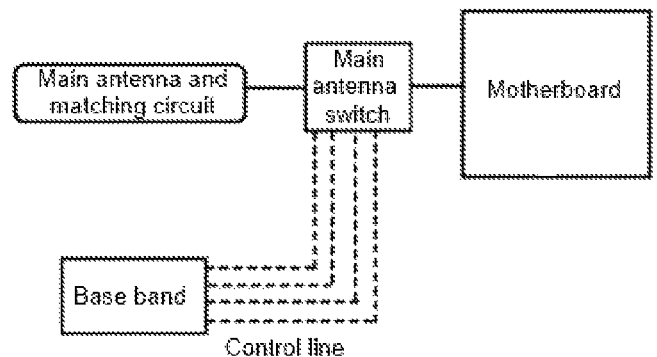
FIG. 1 depicts a schematic view of a traditional mobile phone antenna.
Figure 2:
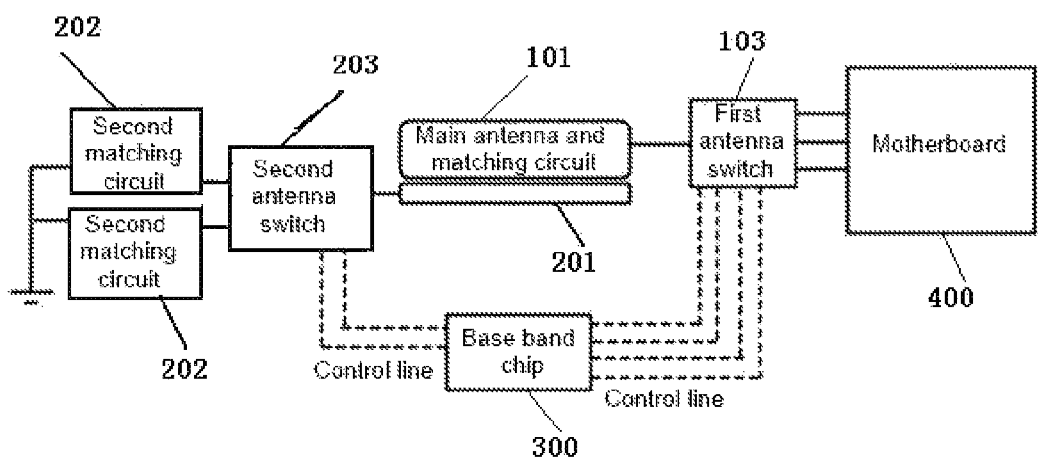
FIG. 2 depicts a structural schematic view of an example embodiment of a broadband mobile phone antenna with a parasitic antenna according to the invention.

Turning to FIG. 2, a structural schematic view of one embodiment of the broadband mobile phone antenna with a parasitic antenna is depicted according to the present invention. A mobile phone antenna may include a main antenna and a matching circuit thereof 101, and a first antenna switch 103 connected with the main antenna and the matching circuit thereof. A matching circuit of the main antenna may be denoted as a first matching circuit. The first antenna switch may also be connected with a mobile phone base band chip 300 and a mobile phone motherboard 400, and may be used to perform frequency band switching of the main antenna. Moreover, a broadband mobile phone antenna with a parasitic antenna may further include a parasitic antenna 201 and at least two second matching circuits 202, as well as, a second antenna switch 203 connected with the parasitic antenna 201 and the second matching circuit 202. The second antenna switch 203 may also be connected with the mobile phone base band chip 300. The parasitic antenna 201 may be set on a position at one side of the main antenna and close to the main antenna, and may be used to change a resonance frequency of the main antenna by coupling with the main antenna. The second antenna switch 203 may be used to implement the parasitic antenna 201 switch between the second matching circuits 202. The first antenna switch 103 may be a main antenna switch, and the second antenna switch 203 may be a parasitic antenna switch.

Further, the second antenna switch 102 may be controlled by the mobile phone base band chip 300, working on the same frequency band as that of the first antenna switch 103. For example, the main antenna switch may select to work at a GSM900 frequency band through preset logic. Then, the second antenna switch, when selecting the working frequency band, may work at the GSM900 frequency band as well. In addition, the logic setting of the second antenna switch may depend on the second matching circuit and a debugging result of the entire antenna.

Moreover, one end of each of the second matching circuits 202 may be grounded. The parasitic antenna may be connected to different second matching circuits through the second antenna switch, so that the parasitic antenna may have different load characters, so as to change coupling of the parasitic antenna and the main antenna correspondingly, thus influencing the resonance frequency of the main antenna and realizing different frequency bands. A throw number of the second antenna switches may be greater than or equal to a number of the second matching circuits.

Figure 3:
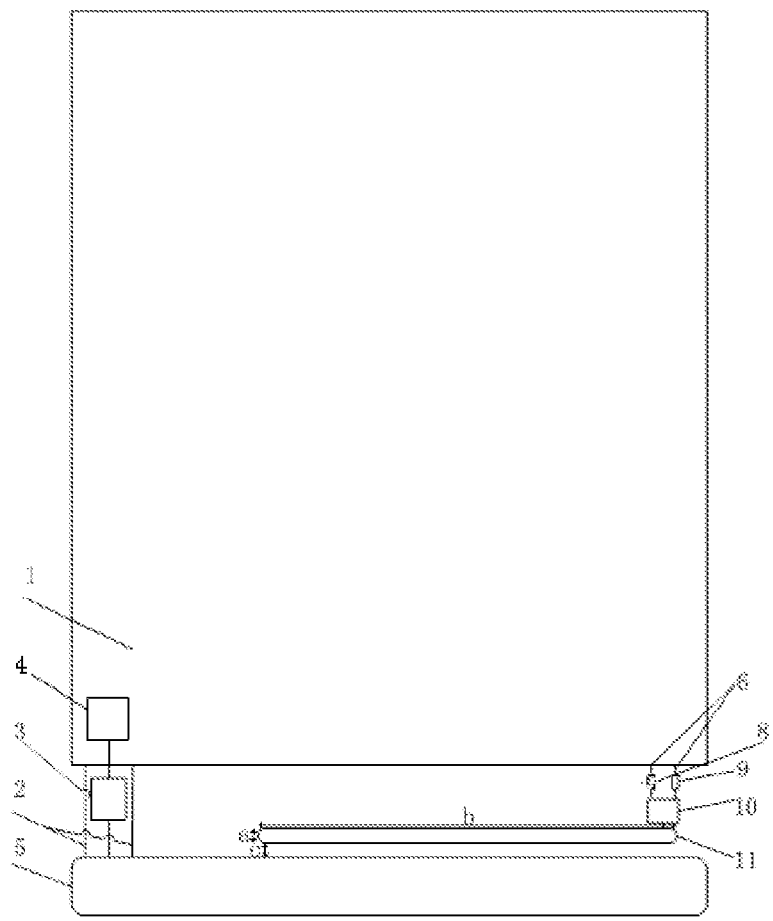
FIG. 3 depicts a schematic view for specific connection of an example embodiment of a broadband mobile phone antenna with a parasitic antenna according to the invention.

With reference to FIG. 3, mobile phone antennas may be arranged in a limited space at an end of an associated mobile phone motherboard 1, including an antenna feed and a corresponding matching circuit 3 (namely the first matching circuit). A main antenna switch 4 (namely the first antenna switch) may be correspondingly set on a radio frequency circuit of the motherboard 1. An antenna may include an antenna grounding switch 2. A mobile phone may include a parasitic antenna 11 branch, a parasitic antenna switch 10 (namely the second antenna switch), two second matching circuits, which may be matching circuit I 8 and matching circuit II 9, and two grounding switches 6, corresponding to a matching circuit I and a matching circuit II. A parasitic antenna may be set close to the main antenna, and may be selected from an FPC, Metal Stamping (metal stamping) or LDS (laser direct structuring) switch, which may be directly made on a main antenna support according to design requirements, and may share a support with the main antenna, so as to be convenient for debugging. A parasitic antenna may also be made on a main PCB of a mobile phone in a printed manner, so as to save cost. A second antenna switch may be set on a radio frequency circuit of a mobile phone motherboard, and may be used as a parasitic antenna switch between the matching circuit I 8 and matching circuit II 9. A number of second matching circuits may be increased according to demands (for example, a matching circuit III and a matching circuit 4, and the like may be added), so that the parasitic antenna may have more load characters, thus enabling the main antenna to have more resonance characters. For consideration of design, two second matching circuits may be adopted, which can satisfy design requirements of most existing mobile phone antennas.

Realizing low frequency bandwidth-intensive coverage is difficult using traditional mobile phone antennas due to such reasons as size of associated mobile phone motherboards and available space for mobile phone antennas, and the like. Generally, bandwidth coverage of 824 M-960 M (GSM850, GSM900, WCDMA) is a limit of traditional mobile phone antennas. A working performance of a mobile phone antenna may be influenced if a bandwidth is deviated to a low frequency of 700 MHz. A parasitic antenna 11 may be connected to different second matching circuits (matching circuit I 8 or matching circuit II 9) through a parasitic antenna switch 10, so that coupling of the parasitic antenna and the main antenna 5 may be altered by changing a load character of the parasitic antenna 11, so as to change a resonance character of the main antenna.

A specific mobile phone example may include a frequency band configuration as follows: LTE: Band2/4/5/17; WCDMA: Band 1/2/5; GSM: GSM850, 900, 1800, 1900. A space dimension occupied by a main antenna may be: 50 mm*9.8 mm*5 mm. It is considered almost impossible to use a traditional simplex main antenna to realize low frequency coverage of 704 MHz-960 MHz.

Figure 4:
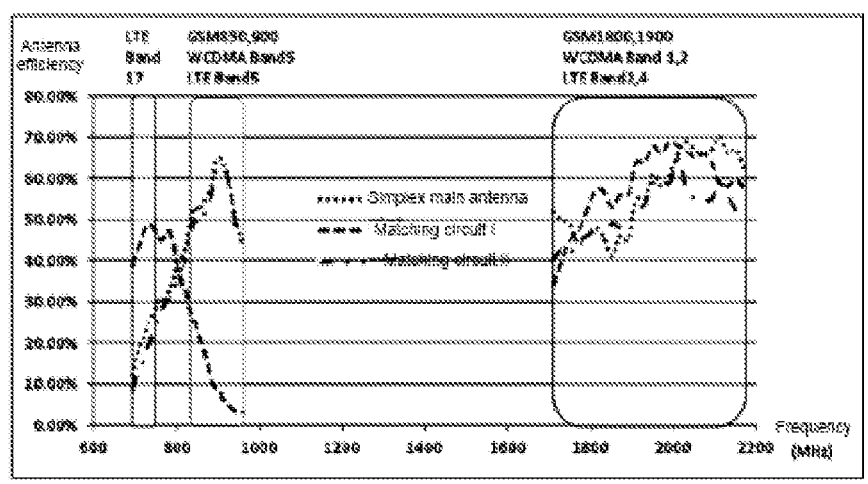
FIG. 4 depicts a structural schematic view of an example broadband mobile phone antenna with a parasitic antenna according to an embodiment of the invention.

With reference to FIG. 4, design efficiency of a simplex main antenna is illustrated. Under a premise of not changing a design of the main antenna, a frequency band and load variable parasitic antenna may be additionally arranged based on a design of the main antenna. As shown in FIG. 3, a size of a parasitic antenna may include a length a=1.5 mm, a width b=35 mm, and a distance, from a parasitic antenna and a main antenna, c=3 mm. Meanwhile, an SPDT (single-pole double-throw) parasitic antenna switch 10 and two corresponding second matching circuits (two second matching circuits may be, respectively, matching circuit I and matching circuit II, wherein the matching circuit I may be 0 ohm, which is representative of a short circuit, and the matching circuit II may be a circuit connected with a 22 nH inductance) may be additionally arranged, then an efficiency of the mobile phone main antenna may be as shown in FIG. 4. A logic configuration of a parasitic antenna switch 10 may be as shown in Table I.

TABLE I

| Logic Configuration of Parasitic Antenna Switch | |
|---|---|
| Second matching circuit | Working band of mobile phone |
| Matching circuit I (8) | GSM1800, 1900, WCDMA Band1, 2, LTE Band2, 4, 17 |
| Matching circuit II (9) | GSM850, 900, WCDMA Band5, LTE Band5 |

With further reference to FIG. 4, the example design of the present invention is compared with a design of a traditional simplex main antenna, wherein an efficiency of a design of the traditional simplex main antenna is only 10%~30% at 704 MHz-746 MHz, which cannot satisfy desired performance requirements of the mobile phone antenna. When a broadband mobile phone antenna of the present invention works at LTE Band 17, a parasitic antenna therein may be connected to a matching circuit I. When the broadband mobile phone antenna of the present invention works at GSM850, 900, WCDMA Band5 and LTE Band 5, a parasitic antenna therein may be connected to a matching circuit II. In this way, an efficiency of a mobile phone antenna on all low frequency bands can be higher than 40%, and may be higher than 50% on most frequency bands. Moreover, when a broadband mobile phone antenna of the present invention works at GSM1800, 1900, WCDMA Band1, 2, LTE Band2 and 4, a mobile phone antenna may have a higher antenna efficiency no matter whether a parasitic antenna therein is connected to a matching circuit I or a matching circuit II. Therefore, the broadband mobile phone antenna according to the present invention can satisfy performance requirements a mobile phone antenna in all the working bands.

In order to prove the actual effects of a broadband mobile phone antenna according to the present invention, a parasitic antenna of a broadband mobile phone antenna in the example embodiment was not debugged until debugging of the main antenna was finished. During actual project debugging, the main antenna and the parasitic antenna may also be debugged together to repeatedly test the result so as to achieve optimum antenna performances.

The foregoing example embodiment of the present invention may utilize a parasitic antenna to expand a low frequency band (700-960 MHz) of a mobile phone antenna. Similarly, a broadband mobile phone antenna of the present invention may be applied to expand high frequency band (applicable to LTE1700-2600 MHZ, and even higher). Moreover, expanding a high frequency band is easier because an associated wavelength is shorter. A principle of a high frequency band may be similar to that of a low frequency band, and will not be repeatedly described herein.

A mobile phone is provided which adopts a broadband mobile phone antenna with a parasitic antenna according to the foregoing embodiments.

A broadband mobile phone antenna with a parasitic antenna and an associated mobile phone may include a parasitic antenna arranged on a main antenna of the mobile phone within limited space; and the parasitic antenna may be switched between different matching circuits through a parasitic antenna switch, so as to have different load characters, and thus influencing a resonance frequency of the main antenna of the mobile phone, so that the mobile phone antenna can work at different working states, so as to satisfy different working band requirements, thus expanding a working band of the main antenna of the mobile phone. In addition, performance of a mobile phone antenna may be significantly improved. Moreover, an embodiment of the present invention may be simple to design, may have very low implementation cost, and may be very suitable to, and may be used in, a multiple-frequency band mobile phone integrating LTE, 3G and 2G.

It should be understood that applications of the present invention, as defined in the appending claims, are not limited to the foregoing. All improvements and transformations of the antennas and mobile phones described herein shall fall within the scope of the appending claims.

The invention claimed is:

1. A broadband mobile phone antenna, comprising;
a parasitic antenna, including a main antenna and a matching circuit thereof;
a first antenna switch connected with the main antenna and the matching circuit thereof, wherein the first antenna switch is further connected with a mobile phone base band chip and a mobile phone motherboard, and is used to perform frequency band switching of said main antenna;
at least two second matching circuits; and
a second antenna switch connected with the parasitic antenna and the at least two second matching circuits, and connected with the mobile phone base band chip, wherein
said parasitic antenna is used to change a resonance frequency of the main antenna by coupling with said main antenna;
said second antenna switch is controlled by a mobile phone base band chip, working on the same frequency band as that of said first antenna switch, and is used to perform switching of said parasitic antenna between said at least two second matching circuits; and
said first antenna switch is a main antenna switch, and said second antenna switch is a parasitic antenna switch.

2. The broadband mobile phone antenna according to claim 1, wherein one end of said second matching circuit is grounded.

3. The broadband mobile phone antenna according to claim 2, wherein a throw number of said second antenna switch is greater than or equal to a number of said at least two second matching circuits.

4. The broadband mobile phone antenna according to claim 2, wherein said parasitic antenna is set on a main antenna support, and shares the main antenna support with the main antenna.

5. The broadband mobile phone antenna according to claim 2, wherein said parasitic antenna is set on a main PCB of the mobile phone in a printed manner.

6. The broadband mobile phone antenna according to claim 4, wherein said parasitic antenna comprises at least one of a metal stamping antenna or a laser direct structuring antenna.

7. The broadband mobile phone antenna according to claim 1, including two of said at least two second matching circuits.

8. A broadband mobile phone, comprising:
a parasitic antenna, including a main antenna and a matching circuit thereof;
a first antenna switch connected with the main antenna and the matching circuit thereof, wherein the first antenna switch is further connected with a mobile phone base band chip and a mobile phone motherboard, and is used to perform frequency band switching of said main antenna;
at least two second matching circuits; and
a second antenna switch connected with the parasitic antenna and the at least two second matching circuits, and connected with the mobile phone base band chip, wherein
said parasitic antenna is used to change a resonance frequency of the main antenna by coupling with said main antenna;
said second antenna switch is controlled by a mobile phone base band chip, working on the same frequency band as that of said first antenna switch, and is used to perform switching of said parasitic antenna between said at least two second matching circuits; and said first antenna switch is a main antenna switch, and said second antenna switch is a parasitic antenna switch.

9. A broadband mobile phone antenna, comprising:
a parasitic antenna, including a main antenna and a matching circuit thereof;
a first antenna switch connected with the main antenna and the matching circuit thereof, wherein said first antenna switch is also connected with a mobile phone base band chip and a mobile phone motherboard, and is used to perform frequency band switching of said main antenna;
at least two second matching circuits and a second antenna switch connected with said parasitic antenna and said at least two second matching circuits, and the second antenna switch is also connected with a mobile phone base band chip, wherein
said parasitic antenna is used to change a resonance frequency of said main antenna by coupling with the main antenna;
said second antenna switch is controlled by the mobile phone base band chip, working on a same frequency band as that of the first antenna switch, and is used to switch said parasitic antenna between said at least two second matching circuits;
said first antenna switch is a main antenna switch, and said second antenna switch is a parasitic antenna switch, and said second antenna switch is set on a radio frequency circuit of the mobile phone motherboard.

10. The broadband mobile phone antenna according to claim 9, wherein one end of at least one of said at least two second matching circuits is grounded.

11. The broadband mobile phone antenna according to claim 10, wherein a throw number of said second antenna switch is greater than or equal to a number of said at least two second matching circuits.

12. The broadband mobile phone antenna according to claim 10, wherein said parasitic antenna is set on a main antenna support, and shares the main antenna support with the main antenna.

13. The broadband mobile phone antenna according to claim 10, wherein said parasitic antenna is set on a main PCB of the mobile phone in a printed manner.

14. The broadband mobile phone antenna according to claim 13, wherein said parasitic antenna comprises at least one of a metal stamping antenna or a laser direct structuring antenna.

15. The broadband mobile phone antenna according to claim 9, including two of said at least two second matching circuits.

16. The broadband mobile phone according to claim 8, wherein one end of said second matching circuit is grounded.

17. The broadband mobile phone according to claim 16, wherein a throw number of said second antenna switch is greater than or equal to a number of said at least two second matching circuits.

18. The broadband mobile phone according to claim 16, wherein said parasitic antenna is set on a main antenna support, and shares the main antenna support with the main antenna.

19. The broadband mobile phone according to claim 16, wherein said parasitic antenna is set on a main PCB of the mobile phone in a printed manner.

20. The broadband mobile phone according to claim 18, wherein said parasitic antenna comprises at least one of a metal stamping antenna or a laser direct structuring antenna.

* * * * *